United States Patent
Langenfeld

(10) Patent No.: US 7,445,537 B2
(45) Date of Patent: Nov. 4, 2008

(54) HUNTING GAME CALL

(76) Inventor: Paul S. Langenfeld, 1411 Alaska Ave., St. Paul, MN (US) 55116

( * ) Notice: Subject to any disclaimer, the term of this patent is extended or adjusted under 35 U.S.C. 154(b) by 300 days.

(21) Appl. No.: 11/295,075

(22) Filed: Dec. 6, 2005

(65) Prior Publication Data

US 2007/0128971 A1 Jun. 7, 2007

(51) Int. Cl.
*A63H 5/00* (2006.01)
(52) U.S. Cl. ................................. 446/213; 446/397
(58) Field of Classification Search ......... 446/201–209, 446/213, 397
See application file for complete search history.

(56) References Cited

U.S. PATENT DOCUMENTS

| | | | | |
|---|---|---|---|---|
| 3,802,120 A | * | 4/1974 | Erhart | 446/77 |
| 4,247,283 A | * | 1/1981 | Vidas | 84/453 |
| 4,466,327 A | * | 8/1984 | Hinton | 84/95.2 |
| 4,940,451 A | * | 7/1990 | Leady | 446/208 |
| 4,970,983 A | * | 11/1990 | LeBlanc et al. | 446/206 |
| 4,997,402 A | * | 3/1991 | Blease | 446/202 |
| 5,355,830 A | * | 10/1994 | deJong | 116/142 FP |
| 5,791,328 A | * | 8/1998 | Alexander | 251/176 |
| 5,800,228 A | * | 9/1998 | Hernandez | 441/94 |
| 6,755,714 B1 | * | 6/2004 | Huddleston | 446/207 |
| 2003/0132055 A1 | * | 7/2003 | Gautieri et al. | 181/148 |
| 2006/0246815 A1 | * | 11/2006 | Simone | 446/213 |
| 2007/0224908 A1 | * | 9/2007 | Vaught | 446/213 |

* cited by examiner

*Primary Examiner*—Gene Kim
*Assistant Examiner*—Urszula M Cegielnik
(74) *Attorney, Agent, or Firm*—Nawrocki, Rooney & Sivertson, P.A.

(57) ABSTRACT

A game call for use during hunting various species of animals. The game call includes a housing at opposite axial ends of which are mounted a pressurized gas reservoir and a nozzle. Pressurized gas in the reservoir passes through an egress port and into a plenum formed in the housing. Gas metered by the plenum of the housing passes through an ingress port into a chamber within the nozzle. A sound-producing member mounted in the chamber is actuated by the gas exhausted through the nozzle.

7 Claims, 7 Drawing Sheets

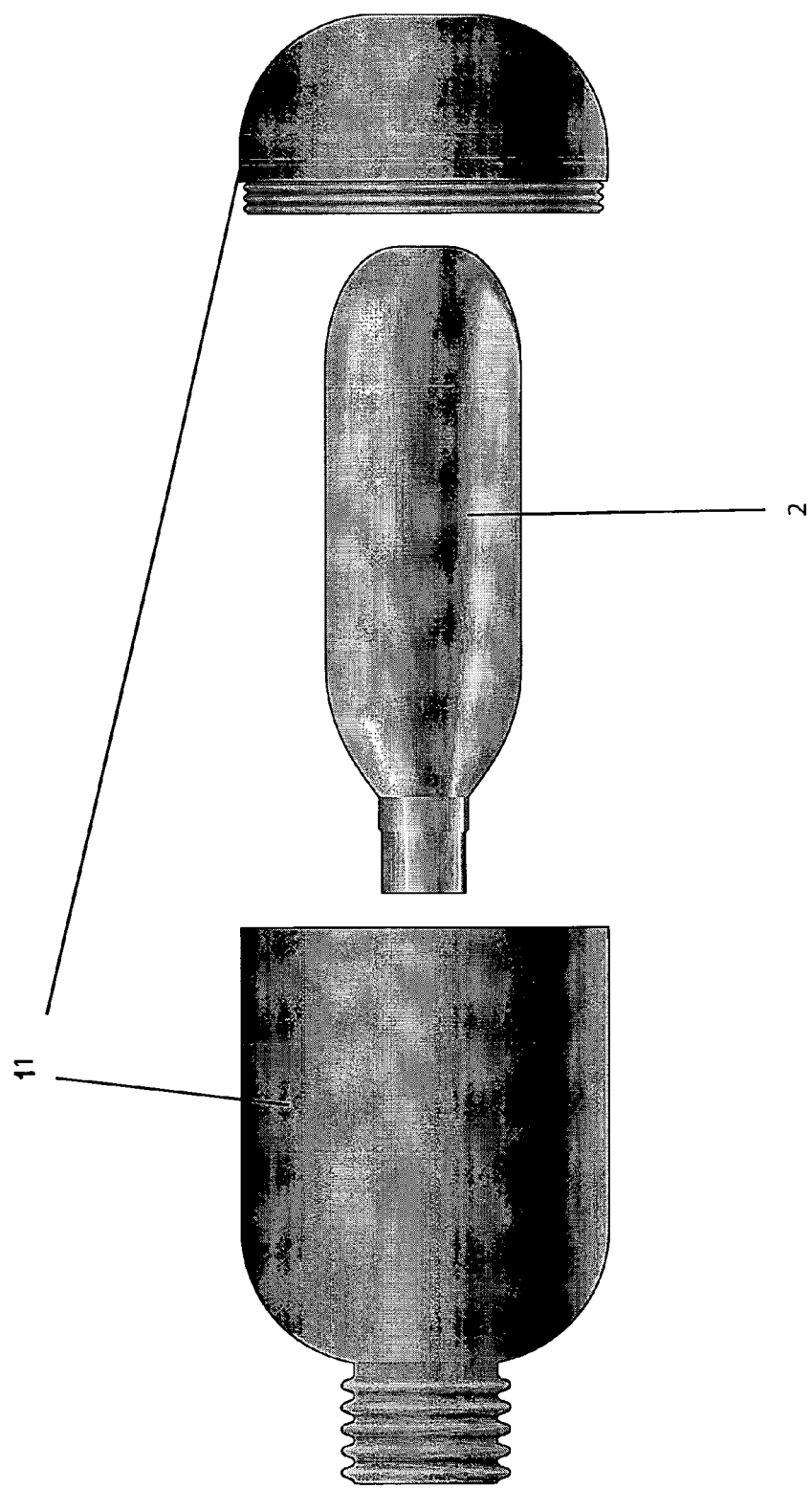

HUNTING GAME CALL

BACKGROUND OF THE INVENTION

Game calls are used extensively in hunting. They are used to simulate sounds of game animals, and they have existed in many different forms. It will be understood that such game calls can be utilized by hunters, but they also can be used by wildlife watchers and other persons needing to observe wild animals.

There are, primarily, two categories of calls that have been used over the years. These are friction calls and reed-actuating calls. Specifically with regard to the latter, it is recognized that a number of drawbacks exist. One limitation is the inability of the user to properly blow through the instrument to actuate the reed. Consequently, while such calls may be easily actuated, proper blowing techniques may be able to be mastered only by a relatively small number of hunters.

Other limitations are, basically, functions of the health and endurance of the person using the call. Fatigue is a factor which can bear not only upon the ability of the individual to generate a reasonable facsimile of the intended call, but it also may make it difficult for the individual to generate any sound.

Even when the hunter is successful in generating a call which is fairly close in simulating the call of the wild animal, significant usage can cause light-headedness. This can be a particularly difficult (and even dangerous) situation. The consequence might be the individual generating the sound falling out of a tree stand, for example.

Further, because of the significant moisture content of breath exhaled by the user as the call is used, there can be problems with freezing. On successive usages, the reed may have become frozen in place and thereby preclude proper operation.

In hunting, it is, of course, important that there be as little motion as possible in generating a game call. This is particularly true of abrupt motion. Many trophy animals have been lost because of motion made in a hunter bringing a game call to his or her mouth to activate the call.

It is to these problems and dictates of the prior art that the present invention is directed. It is an improved hunting game call which addresses the problems and dictates of the prior art.

SUMMARY OF THE INVENTION

In a broad sense, the present invention is a game call for use in attracting animals for hunting and in other enterprises. The game call uses a gas-activated, sound-producing member mounted at one end of a housing, and a gas reservoir mounted at the other end. A valve is employed to selectively regulate flow of gas from the reservoir to the sound-producing member.

In one embodiment of the invention, the reservoir can take the form of a standard-sized pressurized gas cartridge. It is envisioned that a standard-sized $CO_2$ cartridge could be easily employed for this application. The sound-producing member could, of course, be very similar to reeds used in game calls currently known. Such a reed is typically mounted generally parallel to an axis of elongation of the game call.

In a preferred embodiment, valve means are provided for selectively regulating flow of gas from the reservoir to the sound-producing member. Such valve means can be disposed within a housing having first and second opposite axial ends. Mounting of the valve means for selectively regulating flow of the gas of the reservoir to the sound-producing member can be positioned within a plenum within the housing. The pressurized gas reservoir has an egress port mounted to the housing at one of its axial ends. Fluid communication exists between the reservoir and the plenum through an egress port of the reservoir.

A nozzle having a chamber and an ingress port thereto is mounted at the opposite axial end of the housing. The sound-producing member is mounted within the nozzle in an intended flow of exhaust gas from the housing. Such exhaust gas passed into the nozzle through the ingress port thereto.

Valve means in the housing includes first and second occlusion members. It is by manipulating movement of such occlusion members that gas flow is controlled. The valve means further includes means for biasing the occlusion members to positions occluding their respective ports. An actuator is provided to inversely open and close the egress port from the reservoir and the ingress port to the nozzle. The occlusion members are reciprocated so that the gate portions of the respective members overlie their respective ports.

In the preferred embodiment, each gate is provided with a plunger mounted generally perpendicular to a plane defined by a corresponding gate. The actuator can include a vane member, having first and second vane portions, that is disposed for concurrent reciprocal movement within the plenum of the housing. Movement of the vane portions is in directions generally perpendicular to the axis of elongation of the game call. The vane portions are oriented in opposite directions generally at 45° relative to the axis of elongation. Each of such vane portions is in engagement with a corresponding plunger. By moving the actuator in its intended directions, metering of gas from the reservoir, through the plenum of the housing, and by the reed sound-producing member can be accomplished. The present invention is thus an improved hunting game call. More specific features and advantages obtained in view of those features will become apparent with reference to the DETAILED DESCRIPTION OF THE INVENTION, appended claims and accompanying drawing figures.

BRIEF DESCRIPTION OF THE DRAWINGS

FIG. 7 is a side elevational view similar to FIG. 6.

DETAILED DESCRIPTION OF THE INVENTION

Figure 1:
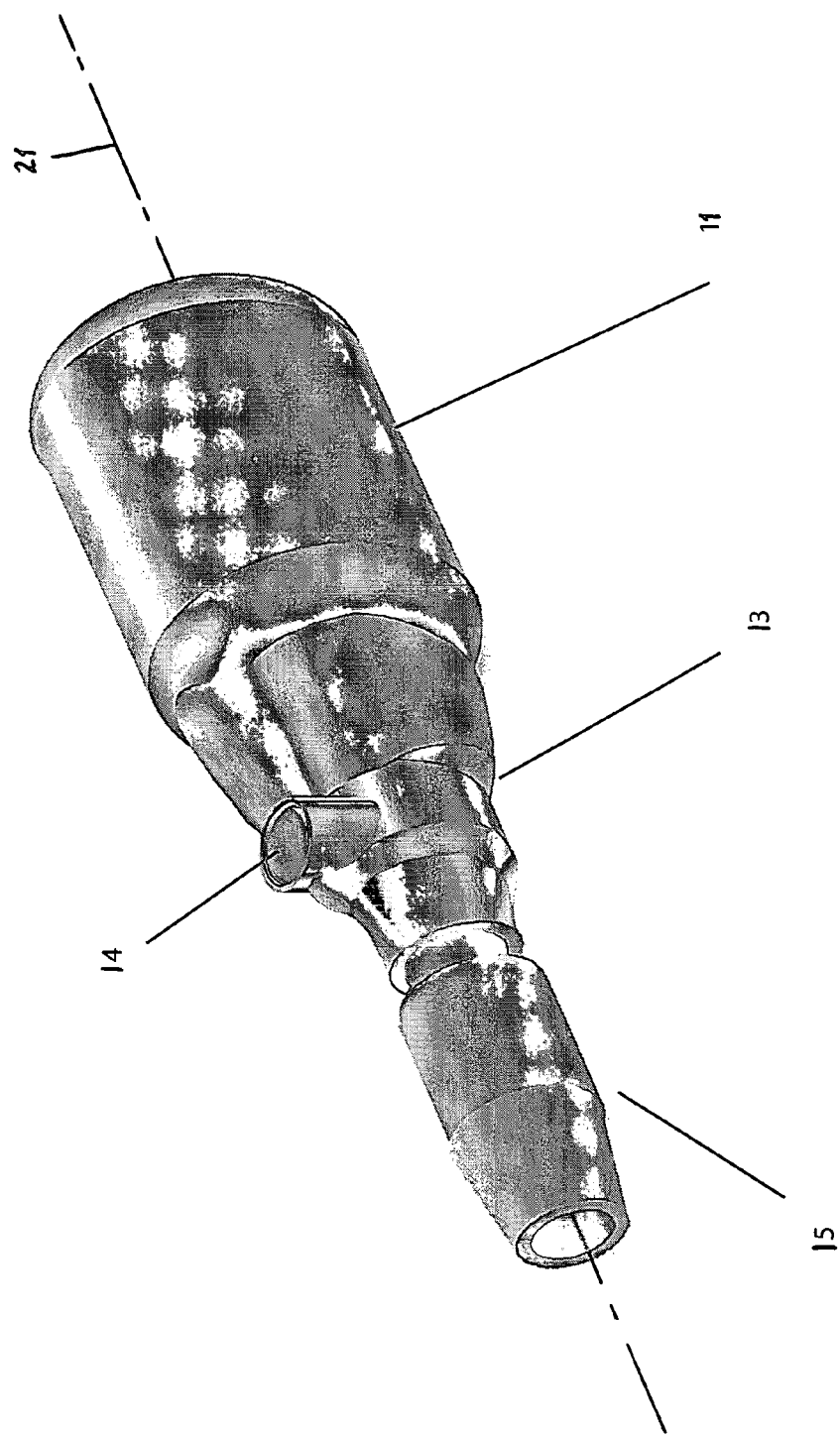
FIG. 1 is a perspective view of a game call in accordance with the present invention.

Referring now to the drawing figures wherein like reference numerals denote elements throughout the several views, FIG. 1 illustrates, in perspective, a game call 10 in accordance with the present invention. The game call 10 is aligned generally along an axis of elongation 21. The game call 10 includes a housing 13 which is disposed centrally. The housing 13 encloses valve means which will be described hereinafter.

At one end of the housing 10 is a casing 11. The casing 11 defines interiorly therewithin a reservoir 20. At the opposite end of the game call 10, the housing 13 mounts a nozzle section 15. The nozzle section 15 includes a sound-producing reed 16. The game call 10 functions by metering gas in reservoir 20 through a plenum 22 in housing 13 and into a chamber 25 in the nozzle section 15 so that the gas flow 17 interacts with sound-producing reed 16 as it passes thereby.

Figure 2:
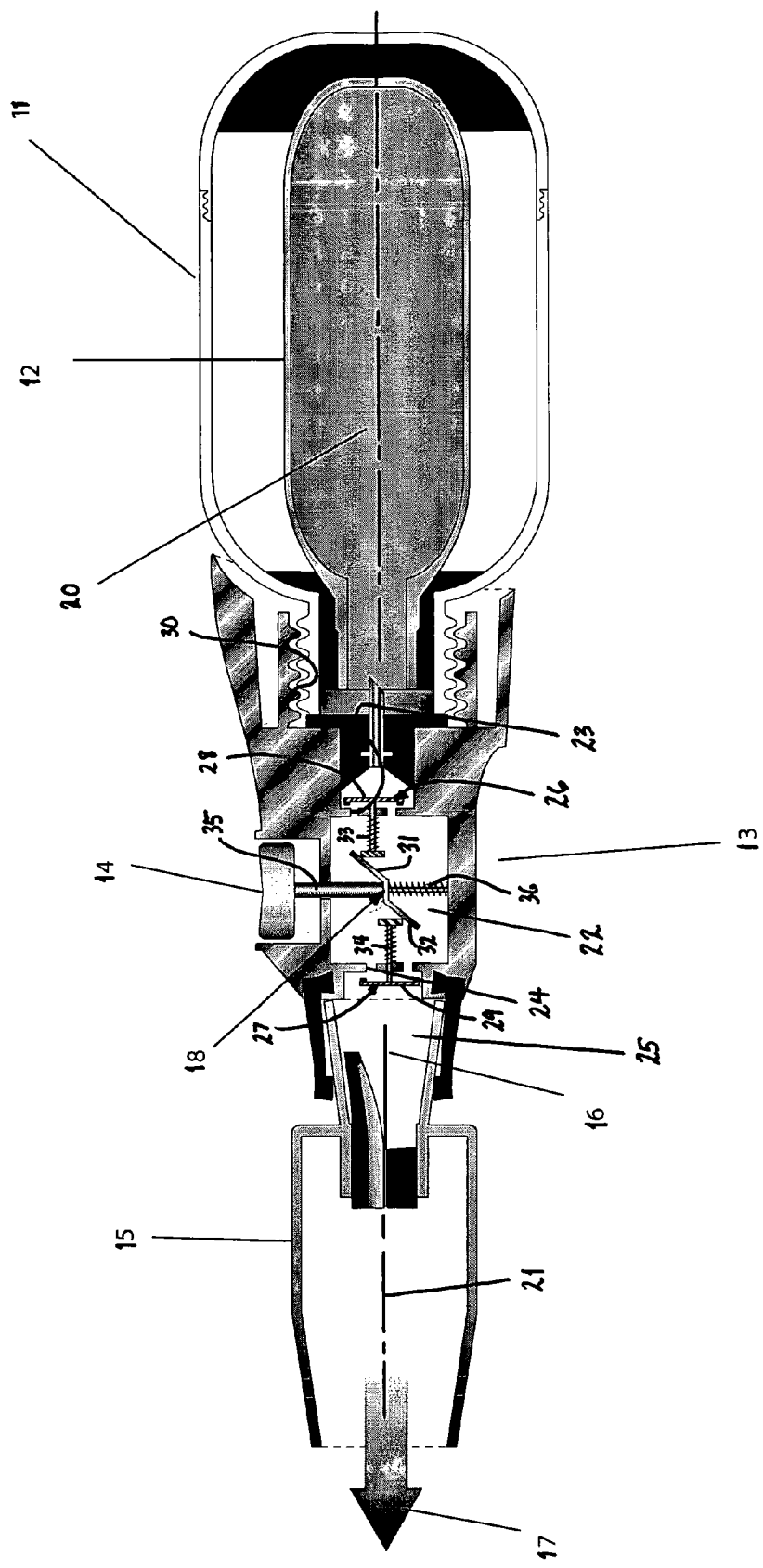
FIG. 2 is a side elevational view of the game call of FIG. 1 in section.

Referring now to FIG. 2, reservoir 20 is defined by a wall housing pressurized gas therewithin. Reservoir 20 can take the form of an off-the-shelf cartridge such as one which is filled with pressurized carbon dioxide. Cartridge 12 can be threaded into a female receptacle 30 in order to mount cartridge 12 to housing 13. An egress port 23 serves to place reservoir 20 in fluid communication with plenum 22 in housing 13. Gas from reservoir 20 is, however, metered through egress port by means of a first occlusion member 26. Member 26 includes a gate 28 which actually obstructs flow through port 23. Spring 33 serves to bias occlusion member 26 to a position wherein port 23 is obstructed by gate 28 of member 26.

Similarly, second occlusion member 27 includes gate 29. It is gate 29 which actually obstructs flow of gas from plenum 22 into chamber 25 in the nozzle section 15. Gate 29 is normally biased, by means of spring 34, to a position where flow of gas from plenum 22 into chamber 25 is obstructed.

Actuator trigger is disposed to move a shaft 35 reciprocally in directions generally perpendicular to the axis of elongation 21 of the game call 10. The shaft carries first vane 31 engaging a first plunger which comprises part of first occlusion member 26. First vane 31 is angled generally at 45° relative to the axis of elongation 21. Second vane 32 engages a plunger which comprises part of second occlusion member 27. The second vane 32 is oriented generally at 45° relative to the axis 21 but in a direction opposite first vane 31.

As will be understood and as previously discussed, first occlusion member 26 is normally biased so that its gate 28 precludes flow of gas through the egress port 23. As actuator trigger 14 is depressed, however, by an operator of the game call 10 and outward biasing of the actuator trigger 14 by a spring 36 is overcome, first vane 31 will depress its corresponding plunger to urge first occlusion member 26 away from its normal position to open egress port 23. Simultaneously, second vane 32 is being moved so as to allow second occlusion member 27 to obstruct flow through ingress port 24. A metered amount of gas from the reservoir 20 will thereby be permitted to enter plenum 22. As actuator trigger 14 is released, spring 36 will urge the vane assembly to its normal position wherein first vane 31 allows closure of egress port 23 and second vane 32 acts to open ingress port 24 to allow passage of gas from the plenum 22 into chamber 25 in the nozzle section 15. As the gas passes sound-producing reed 16, the reed will be actuated to simulate a game call.

One will be able to see that the duration of the call effected is proportional to the size of plenum 22 in housing 13. Consequently, the invention envisions a kit wherein different housings, each having a different sized plenum, are included.

Figure 3:
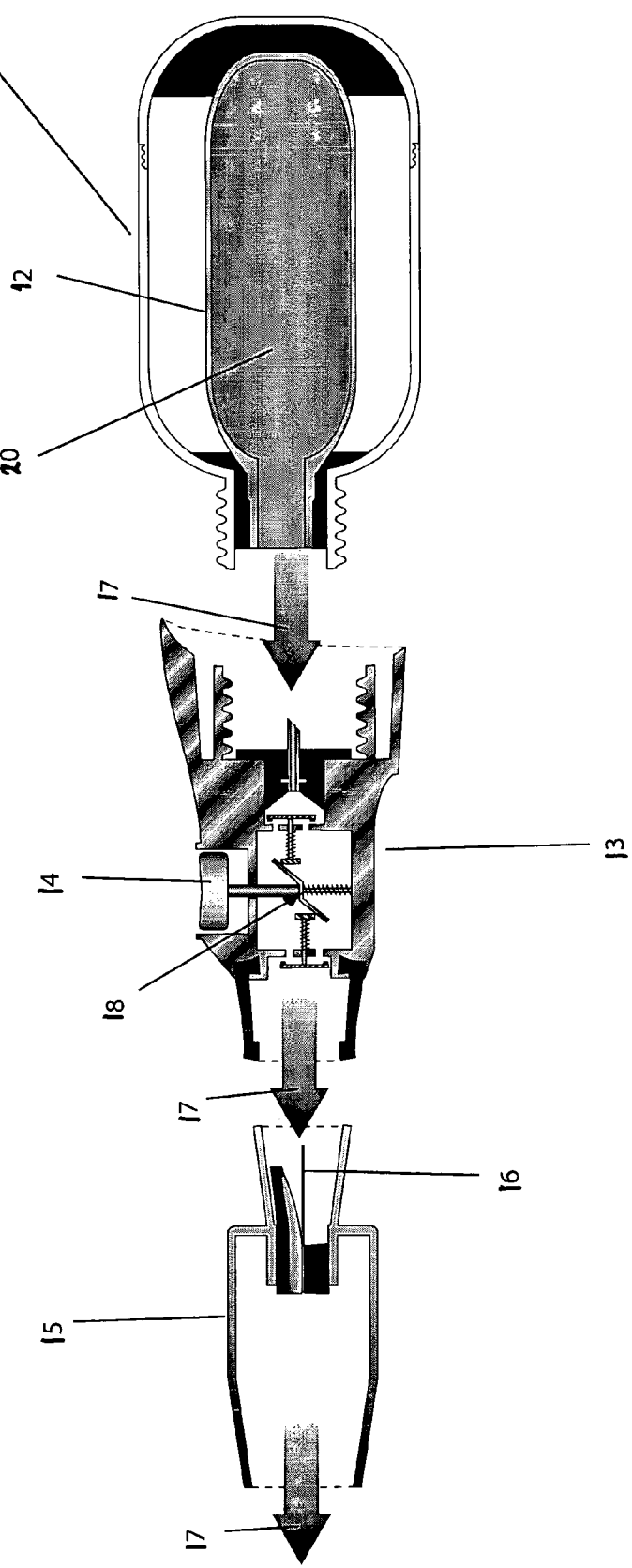
FIG. 3 is an exploded view similar to FIG. 2.
Figure 4:
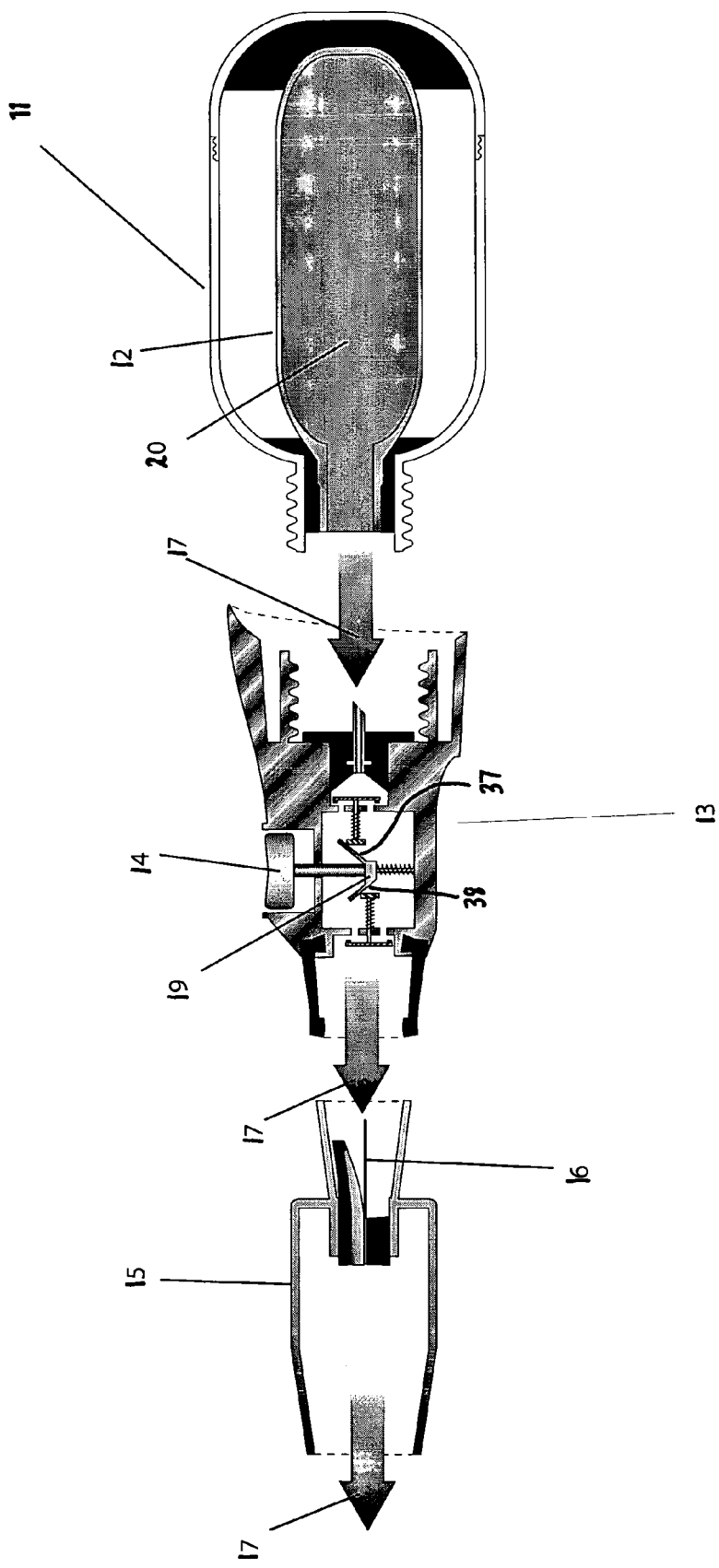
FIG. 4 is a view similar to FIG. 3 illustrating an alternative embodiment of the actuator vane construction.
Figure 5:
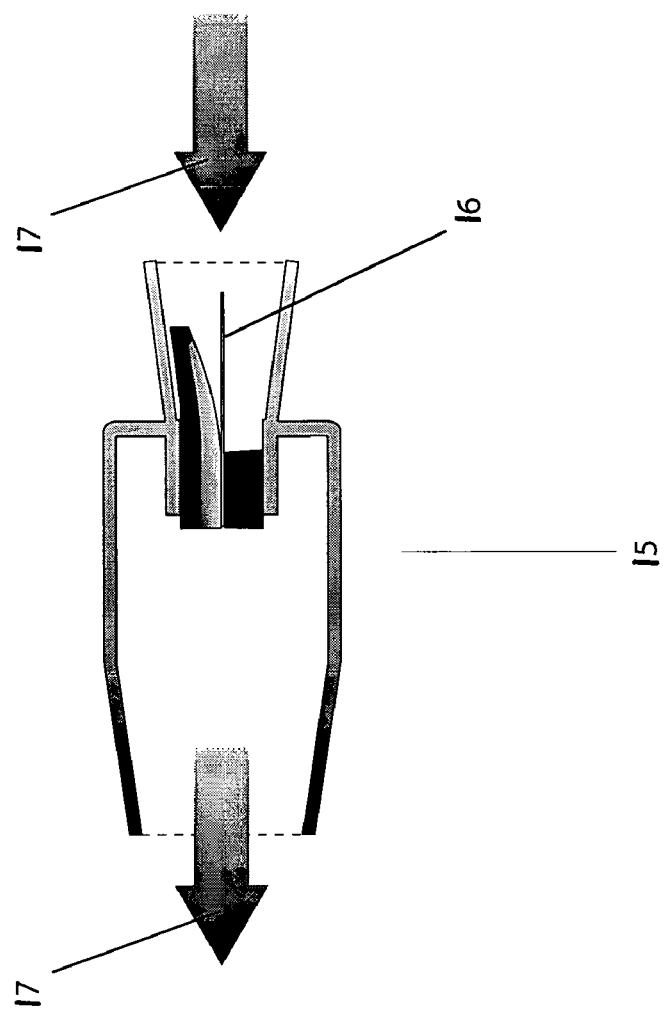
FIG. 5 is a side elevational view, in section, of the nozzle portion of the invention.
Figure 6:
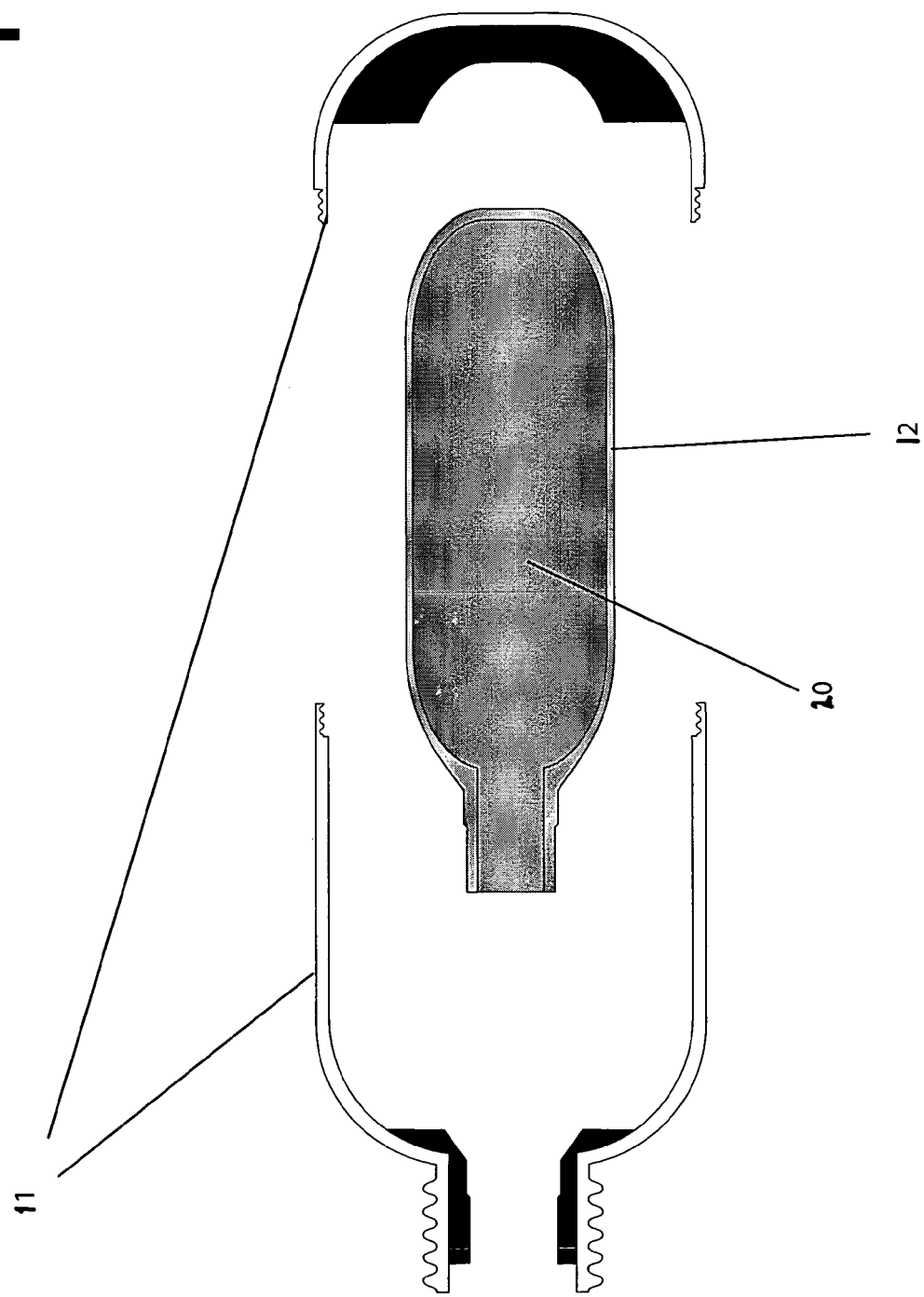
FIG. 6 is an enlarged sectional view of the gas reservoir and structure employed to capture the reservoir.

FIG. 4 illustrates, in a manner similar to FIG. 3, an alternative embodiment of the invention. In that figure, the actuation structure is quite similar to that illustrated in FIGS. 2 and 3. In FIG. 4, however, while a first vane 37 is angled and interfaces with its corresponding occlusion member in the same fashion as in the structures of FIGS. 2 and 3, the second vane 38 is angled differently. In this embodiment, when the user of the game call 10 actuates actuator trigger 14, the egress port 23 and ingress port 24 will both be open at the same time. Consequently, as long as the operator holds down the trigger 14, fluid will flow from the reservoir 20, through the plenum 22 in the housing 13, into nozzle section 15 through ingress port 24, and by sound-producing reed 16. As long as the operator holds the trigger down, therefore, the sound-producing reed will be activated to produce a game call.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A game call, comprising:
 a gas-activated sound-producing member;
 a packaged gas reservoir;
 valve means for selectively regulating flow of gas from said reservoir to said sound-producing member, said valve means having a first occlusion member proximate said packaged gas reservoir and normally biased to a position occluding flow of gas from said reservoir, and a second occlusion member proximate said gas-activated sound-producing member and normally biased to a position occluding flow of gas to said sound-producing member; and
 an actuator assembly having a pair of vanes, one proximate each of said first and second occlusion members, said actuator assembly initiatable by a user of the game call, to control movement of said first and second biased occlusion members.

2. A game call in accordance with claim 1 wherein said reservoir comprises an off-the-shelf cartridge of pressurized gas.

3. A game call in accordance with claim 2 wherein said sound-producing member comprises a reed aligned generally parallel to an axis of elongation of the game call.

4. A hunting game call, comprising:
 a housing having first and second opposite axial ends and a plenum intermediate said ends;
 a pressurized gas reservoir having an egress port, said reservoir mounted to said housing at said first end thereof with said reservoir in fluid communication with said plenum through said egress port;
 a nozzle having an ingress port to a chamber within which a sound-producing member is posited, said nozzle mounted to said housing at said second end thereof with said chamber in fluid communication with said plenum through said ingress port; and
 valve means for regulating gas flow through said egress port and said ingress port, said valve means including:
  a first occlusion member for controlling gas flow through said egress port;
  a second occlusion member for controlling gas flow through said ingress port;
  biasing means for normally urging said occlusion members to positions occluding said ports; and
  an actuator, initiatable by a user of the game call, to inversely open and close said ports by reciprocally moving said occlusion members.

5. A hunting game call in accordance with claim 4 wherein the game call has an axis of elongation and said sound-producing member is aligned generally parallel to said axis.

6. A hunting game call in accordance with claim 4 wherein each occlusion member includes a gate which defines a plane generally normal to said axis, each occlusion member gate having a plunger mounted thereto generally perpendicular to a corresponding gate.

7. A hunting game call in accordance with claim 6 wherein said actuator further includes first and second vanes, disposed for concurrent reciprocal movement within said plenum in directions generally perpendicular to said axis, oriented in opposite directions at generally 45° relative to said axis, each vane in engagement with a corresponding plunger.

* * * * *